US007993041B2

(12) United States Patent  
Petelka

(10) Patent No.: US 7,993,041 B2
(45) Date of Patent: Aug. 9, 2011

(54) LIGHT MOUNTING BAR AND TRACK AND ROLLER SYSTEM FOR SLIDING TARPAULIN TRAILERS

(75) Inventor: Brian W. Petelka, Carlisle (CA)

(73) Assignee: Petelka Investments Ltd., Carlisle, Ontario (CA)

( * ) Notice: Subject to any disclaimer, the term of this patent is extended or adjusted under 35 U.S.C. 154(b) by 445 days.

(21) Appl. No.: 11/961,797

(22) Filed: Dec. 20, 2007

(65) Prior Publication Data

US 2008/0148515 A1 Jun. 26, 2008

(30) Foreign Application Priority Data

Dec. 21, 2006 (CA) .................................... 2571973

(51) Int. Cl.
*B60Q 1/00* (2006.01)
(52) U.S. Cl. ...................... 362/485; 362/540; 362/549
(58) Field of Classification Search .................. 362/485, 362/478, 477, 540, 542–545, 549
See application file for complete search history.

(56) References Cited

U.S. PATENT DOCUMENTS

| 4,711,484 A | 12/1987 | Tuerk |
| 4,902,064 A | 2/1990 | Tuerk et al. |
| 5,026,112 A * | 6/1991 | Rice ........................... 296/186.4 |
| 5,429,408 A | 7/1995 | Henning et al. |
| 5,538,313 A | 7/1996 | Henning |
| 5,658,037 A | 8/1997 | Evans et al. |
| 5,871,270 A * | 2/1999 | Ricker et al. .................. 362/485 |
| 5,924,759 A | 7/1999 | DeMonte et al. |
| 6,065,796 A | 5/2000 | Verduyn |
| 6,926,337 B2 | 8/2005 | Poyntz |
| 7,189,042 B1 | 3/2007 | Schmit |
| 7,195,304 B1 | 3/2007 | Schmeichel |
| 2006/0083012 A1* | 4/2006 | Ter-Hovhannissian ....... 362/485 |

OTHER PUBLICATIONS

Roll-Tite product information from website www.roll-tite.com, Oct. 2007.
Quick Draw product information from website www.quickdrawtarps.com, Feb 2007.

* cited by examiner

*Primary Examiner* — Robert May
(74) *Attorney, Agent, or Firm* — Nixon Peabody LLP; Jeffrey L. Costellia

(57) ABSTRACT

A track and roller system for guiding and supporting a sliding tarpaulin for covering a flat-bed trailer and for supporting at least one light means. The track and roller system comprises a track for supporting for a plurality of rollers and a mounting bar. The rollers are connected to base portions of sliding supports for the tarpaulin. The track has at least one interlocking element. The mounting bar supports the at least one light means below the track. The mounting bar has an outwardly facing supporting portion for supporting the at least one light means and an interlocking portion connected to the supporting portion. The interlocking portion has at least one interlocking element for interlocking with the at least one interlocking element of the track.

9 Claims, 3 Drawing Sheets

LIGHT MOUNTING BAR AND TRACK AND ROLLER SYSTEM FOR SLIDING TARPAULIN TRAILERS

RELATED APPLICATION

This application claims the benefit under Title 35, U.S.C., S.119(e) of Canadian application No. 2,571,973 filed on Dec. 21, 2006.

FIELD OF THE INVENTION

The present invention relates to a mounting bar for supporting a plurality of lights, reflectors or the like. The mounting bar is suitable for attachment to a track and roller system on a sliding-tarpaulin-type flat bed trailer.

BACKGROUND OF THE INVENTION

The placement and number of lights, reflectors or the like on a vehicle is important for both safety and esthetic reasons. Flat-bed trailers and other large vehicles typically have numerous frontal and rear mounted lights and/or reflectors. It is also desirable to mount lights, reflectors and the like along the lateral edges of the trailer so that the driver can determine the location and width of the rear portion of the trailer. In fact, in many jurisdictions it is required by law to mark the lateral edges of a trailer with amber lights and/or reflective tape.

Most flat-bed trailers equipped with sliding tarpaulins have a track and roller system, or some equivalent, to guide and support the sliding tarpaulin between retracted and extended positions. The track and roller system is typically located at the lateral edges of the bed of the trailer. The tarpaulin covers the trailer and extends to cover the track and roller system as well as the lateral edges of the bed. It is not practical to mount lights, reflectors and the like along the base of the tarpaulin (for example to a rigid portion at the base of the tarpaulin) as it moves between extended and retracted positions and the distribution of the lights, reflectors and the like would change. This movement also makes it difficult to connect an electrical supply and/or to replace worn or defective parts.

Embodiments of the present invention provide a track and roller system and a mounting bar connected to the track and roller system for lights, reflectors and the like. The mounting bar supports the lights, reflectors and the like below the track and roller system. The mounting bar is also removable for maintenance or replacement and is easily installed.

SUMMARY OF THE INVENTION

In accordance with an embodiment of the present invention there is provided a track and roller system for guiding and supporting a sliding tarpaulin for covering a flat-bed trailer and for supporting at least one light means. The track and roller system comprises a track for supporting for a plurality of rollers and a mounting bar. The rollers are connected to base portions of sliding supports for the tarpaulin. The track has at least one interlocking element. The mounting bar supports the at least one light means below the track. The mounting bar has an outwardly facing supporting portion for supporting the at least one light means and an interlocking portion connected to the supporting portion. The supporting portion may face outwardly from a lateral edge of the flat-bed of the trailer. The interlocking portion has at least one interlocking element for interlocking with the at least one interlocking element of the track.

In another embodiment of the present invention there is provided a mounting bar for supporting a plurality of lights or the like below a track for a track and roller system on a flat-bed trailer. The track is adapted to support at least one light means and has at least one interlocking element. The mounting bar comprises an outwardly facing supporting portion for supporting the at least one light means and an interlocking portion connected to the supporting portion. The supporting portion may face outwardly from a lateral edge of the flat-bed of the trailer. The interlocking portion has at least one interlocking element for interlocking with the at least one interlocking element of the track.

With this construction of mounting bar and track and roller system, lights, reflectors and the like can be easily mounted along the lateral edges of the bed of a flat-bed trailer. The interlocking elements of the track and the mounting bar secure the mounting bar in place and permit easy installation and/or removal of the lights, reflectors or the like. The mounting bar, being a separate piece from the track and roller system, may advantageously be manufactured out of a lighter weight material as it is not a structural support or load-bearing element of the trailer nor does it act as a side-loading bumper protector.

BRIEF DESCRIPTION OF THE DRAWINGS

These and other advantages of the invention will become apparent upon reading the following detailed description and upon referring to the drawings in which.

Figure 1:
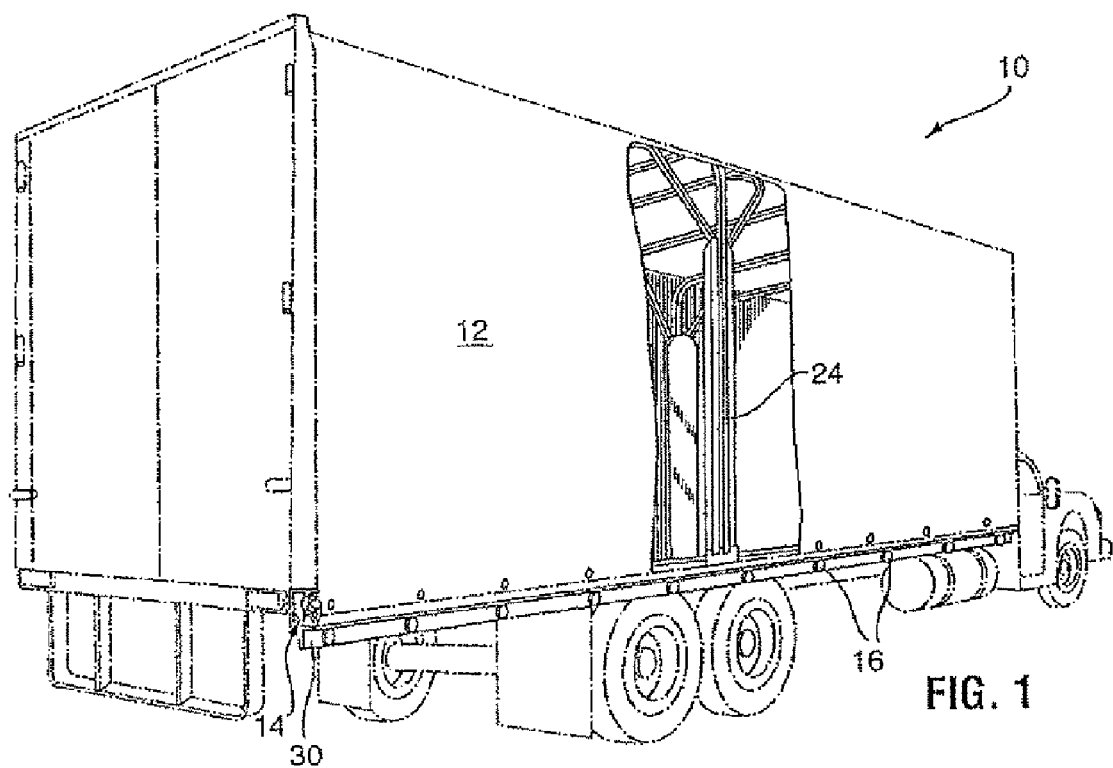
FIG. 1 is a perspective view from the side and rear of a flat-bed trailer having a track and roller system and a mounting bar in accordance with an embodiment of the present invention.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given identical reference numerals where appropriate.

FIG. 1 illustrates a flat-bed trailer 10 covered by a sliding tarpaulin 12. The trailer 10 comprises a track and roller system 14 for guiding and supporting the sliding tarpaulin 12 and for supporting at least one light means 16. It should be understood that any suitable number of light means 16 may be provided. In the embodiment shown in FIG. 1, a plurality of light means 16 are provided and are spaced out along the length of the trailer 10.

Figure 2:
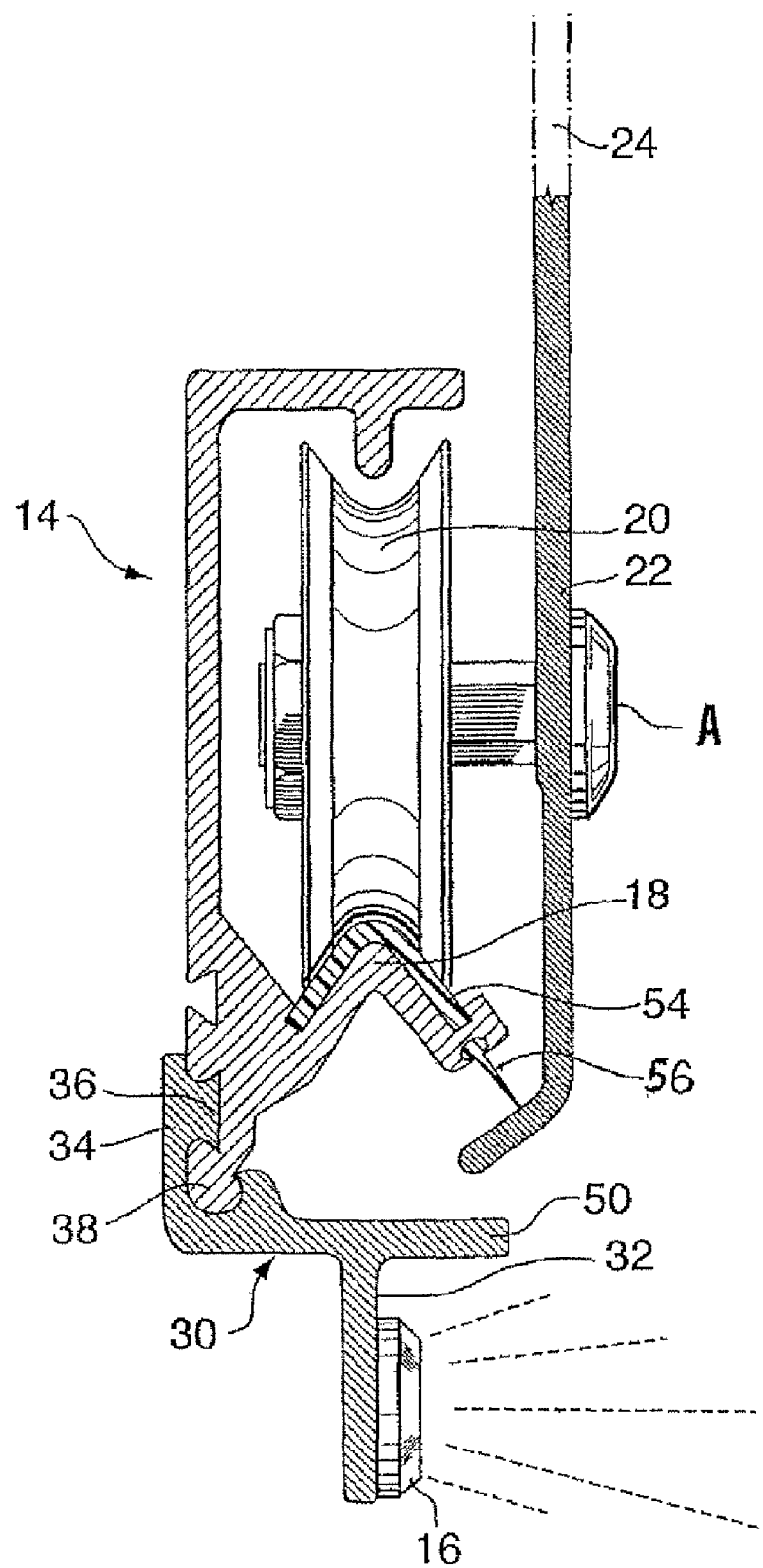
FIG. 2 is a cross-sectional view of the track and roller system and mounting bar of FIG. 1.
Figure 3:
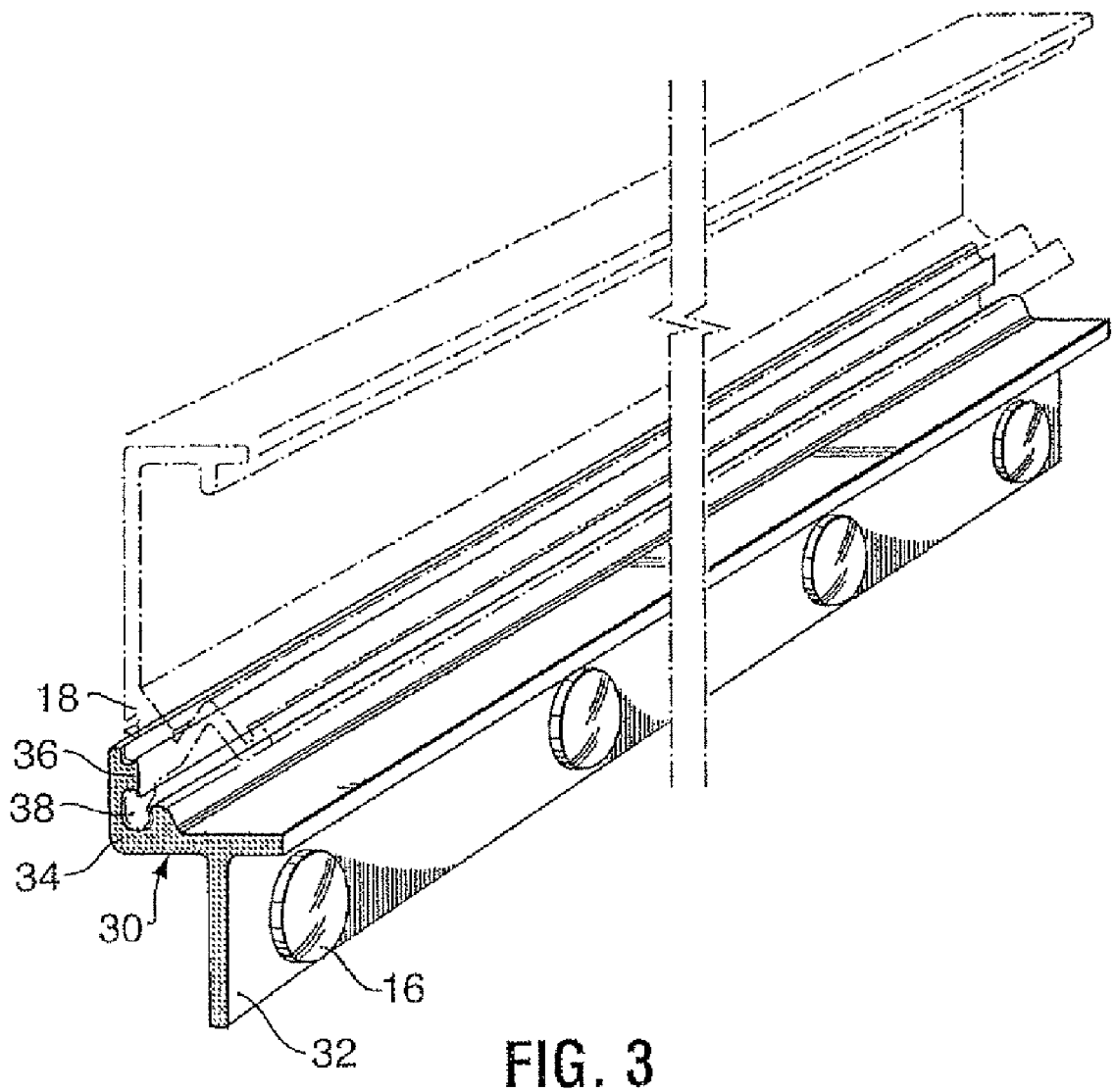
FIG. 3 is a detailed perspective view from the side and rear of the mounting bar of FIG. 1 and the track (shown in stippled lines) of the track and roller system of FIG. 1.

Referring also to FIGS. 2 and 3, the track and roller system 14 comprises a track 18 for supporting a plurality of rollers 20. Rollers 20 are connected to base portions 22 of sliding supports 24 for the tarpaulin.

A mounting bar 30 is provided for supporting the light means 16 below the track. Mounting bar 30 has an outwardly facing supporting portion 32 for supporting the light means 16 and an interlocking portion 34 connected to the outwardly facing supporting portion 32. The outwardly facing supporting portion 32 may be integral with the interlocking portion 34. The outwardly facing portion should be positioned close enough to the outermost edge of the trailer that the driver can see the light means 16 in his/her rearview mirror.

Interlocking portion 34 may be provided with at least one interlocking element 36 for interlocking with at least one interlocking element 38 of the track 18. Any suitable number of interlocking elements 36 of the mounting bar 30 and interlocking elements 38 of the track 18 may be provided. The interlocking elements 38 of the track 18 and the interlocking elements 36 of the mounting bar 30 form mating pairs of depressions and protrusions, as shown in FIGS. 2 and 3. The mounting bar 30 may be installed by sliding it on at one end of the trailer. Alternatively, the mounting bar 30 can be installed in a snap-on fashion, or the track 18 and mounting bar 30 may be provided with another suitable, conventional type of interconnection means.

It should of course be understood that mounting bar could be connected to the track using any suitable attachment means and embodiments of the present invention are not limited to the interlocking elements 36 and 38 shown in the drawings and described herein. It should also be understood that embodiments of the invention incorporating the interlocking elements 36 and 38 are not limited to the particular shapes of the depressions and protrusions shown in the drawings.

Mounting bar 30 may be provided with an extension 50 to protect the side of the trailer and the track and roller system from road spray and debris. This extension 50 may be flush with the innermost portion of the track (FIG. 2).

The light means 16 may be reflectors, lights and/or signaling lights. The mounting bar 30 may also be used to support accessories other than light means 16.

As the light means 16 are mounted below the track and roller system 14, the movement of the sliding tarpaulin 12 between retracted and extended positions does not alter the positioning of the light means 16. The mounting bar 30 is easily accessible for maintenance and repair and can be easily replaced.

The track 18 may be made of aluminum or any other suitable material. The mounting 30 is preferably extruded and may be made of any suitable material, preferably a lightweight material. The rollers 20 may be pressure bearing machined steel wheels or any other suitable type of roller. The mounting bar 30 may similarly be manufactured out of any suitable material. However, it should be noted that as the mounting bar 30 is not a structural support or load-bearing element of the trailer, it may be manufactured from a light weight material, such as a plastic.

The track may be provided with a removable insert 54 to ensure that the roller runs smoothly. Also, a flexible splashguard 56 is preferably provided, located as illustrated or otherwise located in any other appropriate location, to reduce the amount of spray or road debris getting into the track and roller system 14.

Electrical source(s) for the light means 16, where required, may be mounted on the back of the outwardly facing supporting portion 32 or in any other convenient location.

As would be understood by the person skilled in the art, the mounting bar 30 is not limited to attachment to track and roller systems for sliding tarpaulin-type trailers. It could obviously also be attached to other types of trailers or any other type of vehicle.

Thus, it is apparent that there has been provided in accordance with the invention a track and roller system and a mounting bar that fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A track and roller system for guiding and supporting a sliding tarpaulin for covering a flat-bed trailer and supporting at least one light means, the track and roller system comprising:
    a track supporting a plurality of rollers, the rollers being connected to base portions of sliding supports for the tarpaulin, the track having at least one interlocking element;
    a mounting bar supporting the at least one light means below the track, the mounting bar having a supporting portion facing outwardly from a lateral edge of the flat-bed of the trailer, the supporting portion supporting the at least one light means and an interlocking portion connected to the supporting portion, the interlocking portion having at least one interlocking element interlocking with the at least one interlocking element of the track.

2. A track and roller system according to claim 1, wherein the at least one interlocking element of the track and the at least one interlocking element of the mounting bar form mating pairs of depressions and protrusions.

3. A track and roller system according to claim 1, wherein the outwardly facing supporting portion is integral with said interlocking portion.

4. A track and roller system according to claim 1, wherein said mounting bar has an extension to protect the track and roller system from road spray and debris.

5. A track and roller system according to claim 1, comprising a plurality of said light means.

6. A track and roller system according to claim 5, wherein said plurality of light means are spaced out along a length of said mounting bar.

7. A track and roller system according to claim 1, wherein said at least one light means is selected from the group consisting of reflectors, lights and signaling lights.

8. A mounting bar according to claim 1, wherein the outwardly facing supporting portion is integral with said interlocking portion.

9. A mounting bar according to claim 1, wherein said mounting bar is extruded and has a constant lateral cross-section.

* * * * *